United States Patent Office 2,783,132
Patented Feb. 26, 1957

2,783,132

STABILIZATION OF HYDROGEN PEROXIDE

Frank W. Panepinto, Philadelphia, Pa., assignor to The Pennsylvania Salt Manufacturing Company, Philadelphia, Pa., a corporation of Pennsylvania No Drawing. Application August 12, 1953,
Serial No. 373,905

11 Claims. (Cl. 23—207.5)

This invention relates to the stabilization of hydrogen peroxide solutions and particularly relates to the stabilization of concentrated hydrogen peroxide solutions containing 28%, 35%, 50%, and 90% hydrogen peroxide although the invention is not limited thereto.

It has been proposed to stabilize hydrogen peroxide solutions with compounds made by reacting orthophosphoric acid and stannous chloride together at a temperature of about 300° C. for about one hour to produce a tin-pyrophosphate compound. The compound, when used as a stabilizer, is added to hydrogen peroxide solutions in a concentration such that an equivalent of 0.2 gram of pyrophosphoric acid and 5 milligrams of tin as a tin compound are present in each liter of solution.

Hydrogen peroxide of German manufacture (85%) used during World War II as a propellant was commonly stabilized by means of 8-hydroxyquinoline, often in the form of the pyrophosphate or mixed with sodium pyrophosphate. This stabilizer is slowly oxidized by the peroxide so that in about six months an appreciable part of its protective action disappears. Other similar compounds were suggested by German workers such as hydroxy derivatives of acridine. Acridine is oxidized in a manner similar to 8-hydroxyquinoline but at a slower rate.

The concentration of hydrogen peroxide in a solution may be indicated as percentage by weight or volume strength. Technical or commercial grades or hydrogen peroxide are sometimes referred to as being of either 100 or 130 volume strength, which means that, for example, one pint of 100 volume hydrogen peroxide produces 100 pints of oxygen gas, whereas one pint of 130 volume hydrogen peroxide yields 130 pints of oxygen gas, the gas volumes being measured under standard conditions. A 100 volume solution contains 28% by weight of hydrogen peroxide and a 130 volume solution contains 35% by weight of hydrogen peroxide.

In accordance with the present invention, it has been found that stabilizers having an unexpectedly high stabilizing ability are formed by the addition of 8-hydroxyquinoline to tin-pyrophosphate compounds; or, alternatively, excellent stability is obtained by dissolving tetrasodium or tetrapotassium pyrophosphate, sodium or potassium stannate, phosphoric acid, and 8-hydroxyquinoline in peroxide solutions without first forming a reaction product of sodium or potassium stannate and phosphoric acid.

Generally speaking, in the first of the above methods of the invention, metallic tin or a compound of tin, such as stannous hydroxide, stannous oxide, or sodium stannate is reacted with orthophosphoric acid for about one hour at a temperature of about 300° C. In effecting this reaction, the temperature rises rapidly until water begins to boil off and, after the water has been boiled off, the temperature rises rapidly to the preferred maximum of about 300° C. Higher or lower temperatures may be employed, but when a maximum temperature above 300° C. is employed care must be observed to prevent the precipitation of tin. The reaction mixture is maintained at the reaction temperature of about 300° C. for a time sufficient to provide the desired weight loss. The theoretical weight loss is attained when any water of solution is boiled off and all of the orthophosphoric acid is converted to pyrophosphoric acid and a compound of tin and pyrophosphoric acid is formed.

The stabilizer formed by dissolving tetrasodium or tetrapotassium pyrophosphate, sodium or potassium stannate, and phosphoric acid individually in hydrogen peroxide is as effective as a tin-pyrophosphate compound formed by reacting metallic tin and phosphoric acid at 300° C. for about one hour. Since the tin-pyrophosphate reaction product, when it contains a sufficient proportion of dissolved tin for effective stabilization, is a difficultly soluble gel at room temperature, it is not as easy to use as the stabilizer in which the ingredients are individually dissolved in the hydrogen peroxide solution.

The product of the reaction of tin metal with phosphoric acid at about 300° C. was found by a qualitative test to contain tin in the stannous form. The viscosity of the tin-pyrophosphate compound is proportional to the tin content and the maximum desired ratio of tin to phosphoric acid, for convenience in handling, is about one to four. An equally satisfactory water-clear product was prepared by reacting stannous hydroxide with phosphoric acid, the stannous hydroxide being freshly prepared by precipitation from an aqueous solution of stannous chloride by ammonium hydroxide. Stannous oxide reacts with phosphoric acid in the same manner to produce a liquid which is light brown in color. The reaction product prepared from sodium stannate and phosphoric acid was satisfactory but less desirable due to the fact that it forms a gel at room temperature.

The pH of the hydrogen peroxide solution has a direct relation to the stability thereof and all of the stabilizers of the invention are about twice as effective at a pH of 2.0 as at a pH of 4.5. To obtain good stability the pH should in no case be greater than 4.5 and should preferably be in the range of 2.0 to 3.2.

The use of 8-hydroxyquinoline alone appears to have an adverse effect on the stability of hydrogen peroxide solutions in that it catalyzes decomposition of the peroxide solutions. In peroxide solutions, containing only 8-hydroxyquinoline as a stabilizer, which were subjected to decomposition tests at 100° F., decomposition was found to be complete in 47 to 50 days. As a stabilizer, 8-hydroxyquinoline is completely ineffective when used alone.

Since 8-hydroxyquinoline is a light fluffy powder, it tends to float on the surface of hydrogen peroxide solutions without wetting and some difficulty is generally encountered in dissolving 8-hydroxyquinoline in the solutions. This difficulty may be overcome by first dissolving the 8-hydroxyquinoline in aqueous alkali, which takes place smoothly. Since some sodium hydroxide is generally added to the peroxide solution to raise the pH thereof, the addition of sodium hydroxide in this manner has no deleterious effect on the peroxide solution. The solution of 8-hydroxyquinoline and sodium hydroxide has a light yellow color when freshly prepared and should be used immediately, as it begins to darken in about twenty minutes.

In the preparation of the reaction products of metallic tin or tin compounds with orthophosphoric acid about 5 to 30 parts by weight of metallic tin or 15 to 35 parts by weight of stannous oxide, or 15 to 40 parts by weight of stannous hydroxide, or the equivalent of 10 to 80 parts by weight of sodium stannate trihydrate are reacted with the equivalent of about 100 parts by weight of 85% by weight phosphoric acid at an elevated temperature for a time sufficient to effect a desired loss in weight. While 85% orthophosphoric acid is commonly used due to its availability, phosphoric acid of any other concentration may also be used and for more dilute acid the weight loss will be higher, due to the higher water content, and for more concentrated acids or anhydrous acid, the weight loss will be correspondingly reduced. In each case the weight loss represents the water of solution and the water liberated by the formation of pyrophosphoric acid from orthophosphoric acid.

The reaction product of tin or tin compounds and phosphoric acid may be dissolved in the peroxide solution to be stabilized in concentrations of about 0.2 to 0.6 gram per liter of peroxide solution and the 8-hydroxyquinoline is desirably present in a concentration of about 0.02 to 0.1 gram per liter of peroxide solution.

Where the peroxide solution is stabilized by dissolving the stabilizing agents separately therein, the solutions may contain about 0.2 to 0.6 gram per liter of tetrasodium or tetrapotassium pyrophosphate, about 0.1 to 0.4 gram per liter of sodium or potassium stannate, and the equivalent of 0.1 to 0.2 gram per liter of anhydrous phosphoric acid, which may be added as a dilute acid if desired.

When hydrogen peroxide solutions are used in contact with aluminum, such as aluminum containers, serious pitting of the aluminum sometimes results. The heavy, white, crusty deposit formed on the surface of the aluminum has been identified by X-ray diffraction analysis to be predominantly an aluminum compound. Investigation disclosed this pitting attack to be due to chloride ion contamination. The addition of nitrate ion, added as nitric acid, ammonium nitrate, potassium nitrate, or sodium nitrate, was found to be the most effective in arresting the pitting attack due to chloride ion, and an addition of nitrate ion in the proportion of 8 to 10 times the amount of chloride ion contamination was found to be necessary to completely prevent chloride attack.

The invention will be further illustrated by reference to the following specific examples:

EXAMPLE 1

A number of tin-pyrophosphate type stabilizers were prepared by heating various quantities of metallic tin or tin compounds with phosphoric acid for a time sufficient to provide the desired weight loss. The data for these preparations are as shown in Table 1.

*Table 1.—Preparation of tin-pyrophosphate type stabilizers for hydrogen peroxide*

| Stabilizer preparation number | Composition of initial mix | Maximum temp. during heating, °C. | Weight loss expected gms. | Weight loss expected Percent | Weight loss obtained gms. | Weight loss obtained Percent | Suggested composition of product | Physical properties of product |
|---|---|---|---|---|---|---|---|---|
| 1 | 100 gms. 85.5% $H_3PO_4$, 10.6 gms. Sn metal. | 300 | 22.7 | 20.5 | 20.3 | 18.35 | 29.1% (26.3 gms.) $SnH_2P_2O_7$, 68.3% (61.7 gms.) $H_4P_2O_7$, 2.6% (2.4 gms.) $H_2O$. | Clear, water white; flows at room temperature. |
| 2 | 100 gms. 86.4% $H_3PO_4$, 10.6 gms. Sn metal. | 300 | 21.7 | 19.65 | 19.6 | 17.75 | 28.9% (26.3 gms.) $SnH_2P_2O_7$, 68.8% (62.6 gms.) $H_4P_2O_7$, 2.3% (2.1 gms.) $H_2O$. | Clear, water white; considerably more viscous than $H_4P_2O_7$ alone, but flows at room temperature. |
| 3 | 100 gms. 85.5% $H_3PO_4$, 25.8 gms. Sn metal. | 305 | 22.9 | 18.2 | 22.8 | 18.1 | 62.4% (64.2 gms.) $SnH_2P_2O_7$, 37.6% (38.7 gms.) $H_4P_2O_7$, 0.1% $H_2O$. | Clear, water white, gels at room temperature; flows easily at about 75° C. |
| 4 | 100 gms. 86.4% $H_3PO_4$, 52.3 gms. Sn metal. | 300 | 22.4 | 14.7 | 20.4 | 13.39 | 98.5% (129.9 gms.) $SnH_2P_2O_7$, 1.5% (2.0 gms.) $H_2O$. | Crystallizes on standing at room temperature, changes to a milk-white pasty solid on prolonged heating on steam bath. |
| 5 | 100 gms. 86.4% $H_3PO_4$, 33 gms. $Sn(OH)_2$. | 300 | 40.0 | 30.0 | 33.7 | 25.3 | 53.3% (52.9 gms.), 40.4% (40.1 gms.) $H_4P_2O_7$, 6.3% (6.3 gms.) $H_2O$. | Clear, water-white, viscosity is about same as 2. |
| 6 | 100 gms. 86.4% $H_3PO_4$, 25 gms. SnO. | 250 | 24.8 | 19.9 | 22.5 | 18.0 | 53.4% (54.7 gms.) $SnH_2P_2O_7$, 44.3% (45.5 gms.) $H_4P_2O_7$, 2.3% (2.3 gms.) $H_2O$. | Color is somewhat dirty light brown, viscosity is about same as 2. |
| 7 | 100 gms. 86.4% $H_3PO_4$, 78.5 gms. $Na_2SnO_3.3H_2O$. | 330 | 53.3 | 29.8 | 37.4 | 20.9 | 88.7% (125.2 gms.) $(Na_2Sn)_2(P_2O_7)_3$, 11.3% (15.9 gms.) $H_2O$. | Light-brown solid cake at room temperature; some black scum on surface. |
| 8 | 100 gms. 86.4% $H_3PO_4$, 39.2 gms. $Na_2SnO_3.3H_2O$. | 300 | 37.4 | 26.8 | 32.7 | 23.5 | 58.8% (62.6 gms.) $(Na_2Sn)_2(P_2O_7)_3$, 36.8% (39.2 gms.) $H_4P_2O_7$, 4.4% (4.7 gms.) $H_2O$. | As for 7. |
| 9 | 100 gms. 86.4% $H_3PO_4$, 26.3 gms. $Na_2SnO_3.2H_2O$. | 300 | 32.2 | 25.5 | 23.7 | 18.77 | 40.7% (41.7 gms.) $(Na_2Sn)_2(P_2O_7)_3$, 51.1% (52.4 gms.) $H_4P_2O_7$, 8.2% (8.4 gms.) $H_2O$. | As for 7 except semisolid cake with a little free liquid on surface. |
| 10 | 100 gms. 86.4%, 19.6 gms. $Na_2SnO_3.3H_2O$. | 300 | 29.4 | 24.6 | 15.8 | 13.2 | 30.2% (21.3 gms.) $(Na_2Sn)_2(P_2O_7)_3$, 56.7% (58.9 gms.) $H_4P_2O_7$, 13.1% (13.6 gms.) $H_2O$. | Very viscous, silky suspension; light-brown color with a black scum on surface. |
| 11 | 100 gms. 86.4% $H_3PO_4$, 9.8 gms. $Na_2SnO_3.3H_2O$. | 300 | 25.5 | 23.2 | 22.4 | 20.4 | 17.8% (15.6 gms.) $(Na_2Sn)_2(P_2O_7)_3$, 78.7% (68.7 gms.) $H_4P_2O_7$, 3.5% (3.1 gms.) $H_2O$. | As for 10, except somewhat less viscous. |

EXAMPLE 2

A series of 20 hour boiling tests was performed using Stabilizer Number 1 of Example 1 above in varying concentrations in hydrogen peroxide solutions, and also containing varying concentrations of 8-hydroxyquinoline. The results are as shown in Table 2.

Table 2.—*Decomposition of stabilized hydrogen peroxide by 20 hours boiling*

| Stabilizer number | Original conc. of $H_2O_2$ (percent) | Conc. of stabilizer in $H_2O_2$ (g.l.) | Additional stabilizer (g.l.) | Av. percent loss (of 2 samples) | Notes |
|---|---|---|---|---|---|
| 1 | 29.95 | 0.20 | | 10.0 | |
| | | 0.20 | 0.05 8-hydroxyquinoline | 3.7 | |
| | | 0.20 | 1.10 8-hydroxyquinoline | 2.2 | |
| | | 0.375 | | 9.1 | |
| | | 0.375 | 0.05 8-hydroxyquinoline | 2.8 | |
| | | 0.375 | 0.10 8-hydroxyquinoline | 2.3 | |
| | 10.14 | 0.375 | 0.10 8-hydroxyquinoline | 3.2 | Wt. of stabilizer in one liter 30% $H_2O_2$ mixture then diluted to 10.14%. |

It will be observed from the foregoing data that the addition of 8-hydroxyquinoline to peroxide solutions containing the tin-pyrophosphate type stabilizer produced unexpectedly high stability in solutions subjected to the 20 hour boiling test, compared to blanks containing the tin-pyrophosphate type stabilizer alone.

EXAMPLE 3

The following are examples of stabilizers in which the ingredients are weighed out separately and dissolved directly in hydrogen peroxide solution:

Stabilizer Number 12:
 0.3 g./l. $Na_4P_2O_7$
 0.4 g./l. (sodium stannate, 45%; potassium acid tartrate, 55%)
 0.1 g./l. $H_3PO_4$ (85%)

Stabilizer Number 13:
 0.3 g./l. $Na_4P_2O_7$
 0.2 g./l. sodium stannate
 0.1 g./l. $H_3PO_4$ (85%)

Stabilizer Number 14:
 0.3 g./l. $Na_4P_2O_7$
 0.15 g./l. sodium benzoate
 0.05 g./l. (sodium stannate, 45%; potassium acid tartrate, 55%)
 0.005 g./l. $H_3PO_4$ (85%)

Stabilizer Number 15:
 0.3 g./l. $Na_4P_2O_7$
 0.4 g./l. (sodium stannate, 45%; potassium acid tartrate, 55%)
 0.005 g./l. $H_3PO_4$ (85%)

Stabilizer Number 16:
 0.15 g./l. $Na_4P_2O_7$
 0.4 g./l. (sodium stannate, 45%; potassium acid tartrate, 55%)
 0.1 g./l. $H_3PO_4$ (85%)

Stabilizer Number 17:

0.3 g./l. $Na_4P_2O_7$ = 0.503 g./l. $Na_4P_2O_7 \cdot 10H_2O$ 0.2 g./l. (sodium stannate, 45%; potassium acid tartrate, 55%)

0.1 g./l. $H_3PO_4$ = 0.118 g./l. $H_3PO_4$ (85%)

EXAMPLE 4

A series of 100° F. storage tests was performed to determine the effect of tin-pyrophosphate type stabilizers and 8-hydroxyquinoline upon peroxide solutions when subjected to elevated temperatures for extended periods. The results are as shown in Table 3. The stabilizers employed were Number 1 of Example 1 above, and Numbers 12 and 13 of Example 3 above.

Table 3.—*Decomposition of stabilized 30% hydrogen peroxide at 100° F.*

| Stabilizer number | Original concentration of $H_2O_2$, percent | Concentration of stabilizer in $H_2O_2$, g./l. | Additional stabilizer, g./l. | 14 days, percent loss | 29 days, percent loss | 57 days, percent loss | 98 days, percent loss | 131 days, percent loss | 181 days, percent loss | 390 days, percent loss | Appearance of $H_2O_2$ solutions after 399 days Color | Sediment |
|---|---|---|---|---|---|---|---|---|---|---|---|---|
| 1 | 30.10 | 0.20 | | 0.830 | 1.06 | 2.06 | 3.25 | 4.68 | 6.23 | 12.89 | None | Slight. |
| 1 | 30.10 | 0.20 | 0.05 8-hydroxyquinoline. | 0.548 | 0.166 | 0.268 | 0.797 | 0.732 | 0.801 | 1.12 | do | Do. |
| 1 | 30.10 | 0.20 | 0.10 8-hydroxyquinoline. | 0.432 | 0.41 | 0.712 | 0.586 | 0.975 | 0.863 | 0.963 | Faint yellow tinge. | Moderate. |
| 1 | 30.09 | 0.375 | | 0.814 | 1.28 | 2.24 | 3.62 | 5.05 | 6.95 | 14.38 | None | Do. |
| 1 | 30.09 | 0.375 | 0.05 8-hydroxyquinoline. | 0.566 | 0.093 | 0.268 | 0.76 | 0.840 | 0.705 | 0.994 | do | Do. |
| 1 | 30.09 | 0.375 | 0.10 8-hydroxyquinoline. | 0.083 | 0.100 | 0.132 | 0.415 | 0.382 | 0.266 | 0.695 | Faint yellow tinge. | Do. |
| 12 | 30.07 | 0.80 | | 1.98 | 4.01 (32 days) | | 6.87 (74 days) | 8.13 (105 days) | 9.18 (158 days) | 13.20 (366 days) | None | Very slight. |
| 13 | 29.98 | 0.60 | | 0.058 | | 1.43 (67 days) | 1.65 | | 2.25 (151 days) | 4.30 (359 days) | do | Cloudy solution. |
| Blank | 30.10 | Blank | | 18.70 | 36.24 | 63.10 | 84.94 | 92.93 | 97.54 | 100.00 | do | None. |

It will be observed from the above data that the addition of 8-hydroxyquinoline to the tin-pyrophosphate type stabilizer resulted in an unexpected increase in the stability of the peroxide solution upon prolonged standing at elevated temperatures and the solution containing 0.375 gram per liter of tin-pyrophosphate stabilizer and 0.10 gram per liter of 8-hydroxyquinoline had the unexpectedly low loss of 0.695% at the end of 390 days, whereas the unstabilized blank was completely decomposed in this period.

From the foregoing it is apparent that the stabilizers of the present invention impart unexpectedly high stability to hydrogen peroxide solutions, and the novel stabilizers have the further desirable attribute of containing no chloride ion. Hence, the addition of the stabilizers to peroxide solutions does not increase the chloride ion contamination, which is advantageous in reducing the pitting attack on aluminum.

It will be obvious to those skilled in the art that many modifications may be made within the scope of the present invention without departing from the spirit thereof and the invention includes all such modifications.

I claim:

1. A stabilized hydrogen peroxide solution, having a pH of less than 4.5 stabilized with about 0.2 to 0.6 gram per liter of the reaction product resulting from heating a mixture of about 5 to 30 parts by weight of metallic tin and the equivalent of about 100 parts by weight of 85% by weight phosphoric acid at an elevated temperature for a period of time sufficient to effect a loss in weight of about 18%, calculated on the basis of 85%, and about 0.02 to 0.1 gram per liter of 8-hydroxyquinoline.

2. A stabilized hydrogen peroxide solution, having a pH of less than 4.5, stabilized with about 0.2 to 0.6 gram per liter of the reaction product resulting from heating a mixture of about 20 to 40 parts by weight of stannous hydroxide and the equivalent of about 100 parts by weight of 85% by weight phosphoric acid at an elevated temperature for a period of time sufficient to effect a loss in weight of about 20 to 30% calculated on the basis of 85% acid, and 0.02 to 0.1 gram per liter of 8-hydroxyquinoline.

3. A stabilized hydrogen peroxide solution, having a pH of less than 4.5, stabilized with about 0.2 to 0.6 gram per liter of the reaction product resulting from heating a mixture of about 20 to 30 parts by weight of stannous oxide and the equivalent of about 100 parts by weight of 85% by weight phosphoric acid at an elevated temperature for a period of time sufficient to effect a loss in weight of about 15 to 20%, calculated on the basis of 85% acid, and about 0.02 to 0.1 gram per liter of 8-hydroxyquinoline.

4. A stabilized hydrogen peroxide solution, having a pH of less than 4.5, stabilized with about 0.2 to 0.6 gram per liter of the reaction product resulting from heating a mixture of the equivalent of about 10 to 85 parts by weight of sodium stannate trihydrate and the equivalent of about 100 parts by weight of 85% by weight phosphoric acid at an elevated temperature for a period of time sufficient to effect a loss in weight of about 10 to 30%, calculated on the basis of 85% acid, and about 0.02 to 0.1 gram per liter of 8-hydroxyquinoline.

5. A stabilized hydrogen peroxide solution, having a pH of less than 4.5, stabilized with about 0.2 to 0.6 gram per liter of the reaction product resulting from heating a mixture of a material selected from the group consisting of metallic tin, stannous hydroxide, stannous oxide, and sodium stannate and phosphoric acid at an elevated temperature for a period of time sufficient to effect a desired weight loss, and about 0.02 to 0.1 gram per liter of 8-hydroxyquinoline.

6. A stabilized hydrogen peroxide solution having a pH of less than 4.5 stabilized with about 0.02 and 0.1 g./l. of 8-hydroxyquinoline, about 0.2 to 0.6 gram per liter of a compound selected from the group consisting of tetrasodium pyrophosphate and tetrapotassium pyrophosphate, about 0.1 to 0.4 gram per liter of a compound selected from the group consisting of sodium stannate and potassium stannate and phosphoric acid sufficient to furnish the equivalent of about 0.1 to 0.2 gram per liter of anhydrous phosphoric acid.

7. A stabilized hydrogen peroxide solution having a pH of less than 4.5, stabilized with about 0.2 to 0.6 gram per liter of a soluble pyrophosphate, a soluble tin salt in a quantity to furnish the equivalent of about 0.02 to 0.2 gram per liter of metallic tin, and about 0.02 to 0.1 gram per liter of 8-hydroxyquinoline.

8. A hydrogen peroxide solution stabilized with 0.02 to 0.1 gram per liter of 8-hydroxyquinoline, about 0.2 to 0.6 gram per liter of a compound selected from the group consisting of tetrasodium pyrophosphate and tetrapotassium pyrophosphate, about 0.1 to 0.4 gram per liter of a compound selected from the group consisting of sodium stannate and potassium stannate and phosphoric acid in sufficient quantity to adjust the pH to less than 4.5.

9. A stabilized hydrogen peroxide having a pH of less than 4.5 stabilized with 0.02 to 0.1 gram per liter of 8-hydroxyquinoline, about 0.2 to 0.6 gram per liter of a compound selected from the group consisting of tetrasodium pyrophosphate and tetrapotassium pyrophosphate and about 0.1 to 0.4 gram per liter of a compound selected from the group consisting of sodium stannate and potassium stannate.

10. A stabilized hydrogen peroxide solution having a pH of less than 4.5 stabilized with about 0.2 to 0.6 gram per liter of a soluble pyrophosphate, a soluble tin salt in a quantity to furnish the equivalent of about 0.02 to 0.2 gram per liter of metallic tin, about 0.02 to 0.1 gram per liter of 8-hydroxyquinoline and phosphoric acid in a quantity to furnish the equivalent of about 0.1 to 0.2 gram per liter of anhydrous phosphoric acid.

11. A stabilized hydrogen peroxide solution containing about 0.2 to 0.6 gram per liter of a soluble pyrophosphate, a soluble tin salt in a quantity to furnish the equivalent of about 0.02 to 0.2 gram per liter of metallic tin, about 0.02 to 0.1 gram per liter of 8-hydroxyquinoline and phosphoric acid in sufficient quantity to adjust the pH to less than 4.5.

References Cited in the file of this patent

UNITED STATES PATENTS

| | | |
|---|---|---|
| 1,958,204 | Reichert | May 8, 1934 |
| 2,004,809 | Gilbert et al. | June 11, 1935 |
| 2,008,726 | Reichert | July 23, 1935 |
| 2,027,838 | Reichert | Jan. 14, 1936 |
| 2,624,655 | Greenspan | Jan. 6, 1953 |